United States Patent
Izumida

(10) Patent No.: US 7,280,522 B2
(45) Date of Patent: Oct. 9, 2007

(54) METHOD FOR PREPARING A PROFILE IN W-CDMA COMMUNICATION

(75) Inventor: Ayumi Izumida, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 1035 days.

(21) Appl. No.: 10/452,280

(22) Filed: Jun. 3, 2003

(65) Prior Publication Data

US 2003/0227890 A1 Dec. 11, 2003

(30) Foreign Application Priority Data

Jun. 7, 2002 (JP) .............................. 2002/166498

(51) Int. Cl.
- *H04B 7/216* (2006.01)
- *H04B 7/00* (2006.01)
- *H04J 3/06* (2006.01)
- *H04L 7/00* (2006.01)

(52) U.S. Cl. .................. 370/342; 370/503; 370/509; 370/335; 375/357; 375/149; 375/134; 375/353; 455/502; 455/265

(58) Field of Classification Search ................ 370/324, 370/335, 342, 503–520; 375/134, 145, 149, 375/371, 354–357; 455/502, 227, 265
See application file for complete search history.

(56) References Cited

U.S. PATENT DOCUMENTS

| 5,550,811 A | * | 8/1996 | Kaku et al. ................ 370/342 |
| 5,818,869 A | * | 10/1998 | Miya et al. ................ 375/150 |
| 5,872,960 A | * | 2/1999 | Oz et al. ................ 713/501 |
| 6,173,008 B1 | | 1/2001 | Lee |
| 6,175,848 B1 | * | 1/2001 | Riley ....................... 708/300 |

(Continued)

FOREIGN PATENT DOCUMENTS

EP 1 152 544 A1 11/2001

(Continued)

OTHER PUBLICATIONS

Tetsuhiko Miyatani et al, "A Reduced-Complexity Path Timing Detection Method for DS-CDMA", Universal Personal Communications, 1998, ICUPC 1998, IEEE 1998 International Conference on Florence, Italy, Oct. 5-9, 1998, New York, NY, USA, IEEE, US, Oct. 5, 1998, pp. 357-361.

(Continued)

*Primary Examiner*—Duc M. Nguyen
(74) *Attorney, Agent, or Firm*—Sughrue Mion Pllc.

(57) ABSTRACT

The method of this invention for preparing a profile in W-CDMA which, using a timer value and norm value, helps a mobile unit to synchronize its signals with those of a base station, comprising providing a profile data preparing portion which cumulatively adds a new norm value to a previous cumulative value fetched from a profile memory to cause the result to be stored as a current cumulative value in a profile memory and repeat the same cumulative addition each time a new norm value is fed to said portion; furnishing the profile data preparing portion with an overflow detection ability to detect the overflow of the profile memory; and choosing, when the overflow of the profile memory is detected, a maximum writable value of the profile memory, and causing the profile memory to store said maximum writable value as a current cumulative value.

12 Claims, 14 Drawing Sheets

U.S. PATENT DOCUMENTS

| | | | |
|---|---|---|---|
| 6,266,385 B1* | 7/2001 | Roy et al. | 375/372 |
| 7,095,811 B1* | 8/2006 | Shikh-Bahaei et al. | 375/340 |
| 7,130,332 B1* | 10/2006 | Shenoi | 375/150 |
| 2001/0040884 A1* | 11/2001 | Bouquier et al. | 370/350 |
| 2002/0122557 A1* | 9/2002 | Aihara et al. | 380/261 |
| 2002/0136277 A1* | 9/2002 | Reed et al. | 375/148 |
| 2003/0176201 A1* | 9/2003 | Sih et al. | 455/502 |
| 2006/0056552 A1* | 3/2006 | Oh et al. | 375/350 |

FOREIGN PATENT DOCUMENTS

| | | |
|---|---|---|
| JP | 8-116293 A | 5/1996 |
| JP | 2000-174729 A | 6/2000 |
| JP | 2001-24558 A1 | 1/2001 |
| JP | 2001-136101 A1 | 5/2001 |
| JP | 2001-244835 A1 | 9/2001 |
| JP | 2001-298404 A1 | 10/2001 |

OTHER PUBLICATIONS

Matthew Thompson et al, "A 650-MHZ Communications Receiver Implemented using CMOS ASICs" ASIC Conference and Exhibit, 1991. Proceedings., Fourth Annual IEEE International Rochester, NY, USA Sep. 23-27, 1991, New York, NY, USA, IEEE, US, Sep. 23, 1991, pp. P1-1.1-P1-1.4.

* cited by examiner

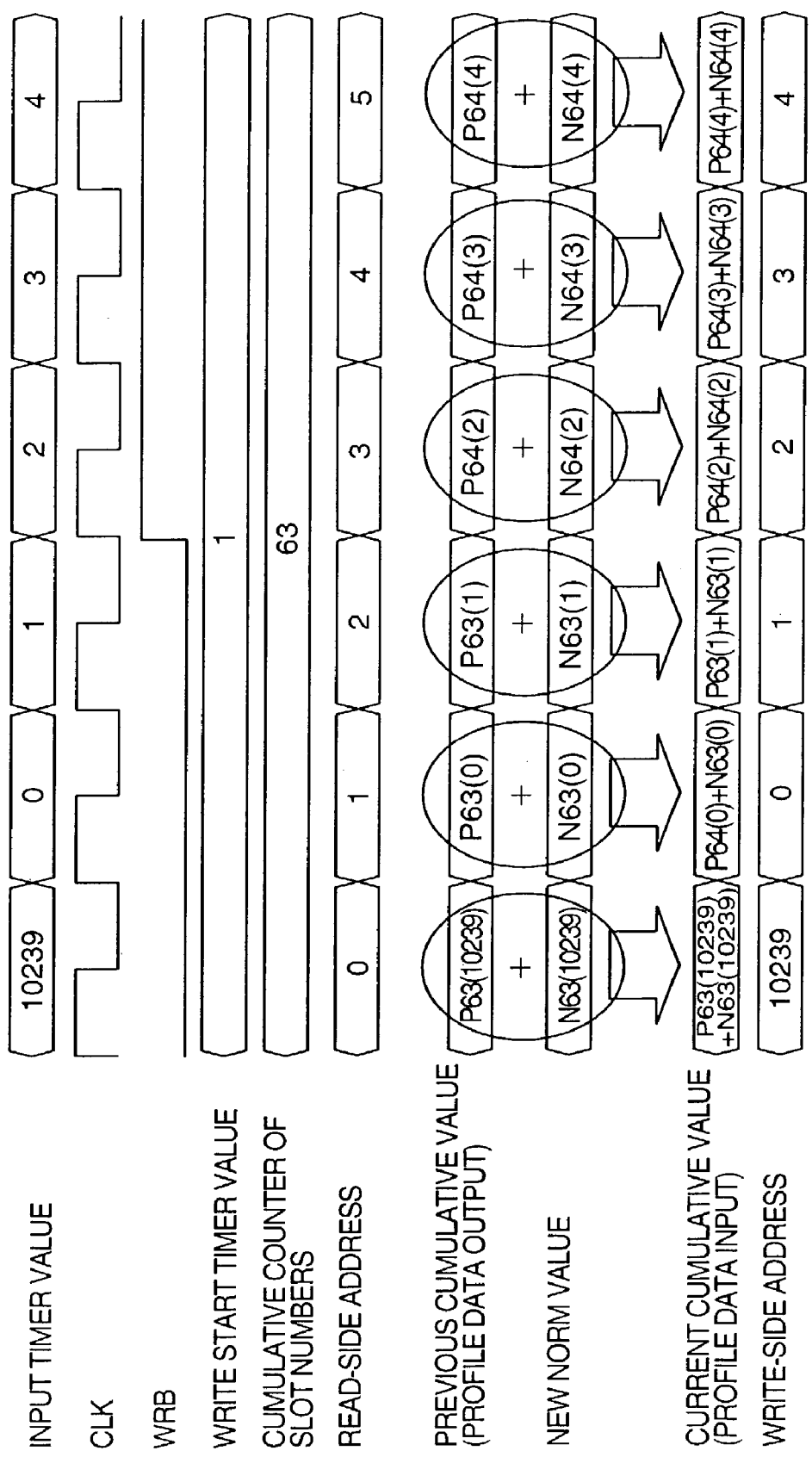

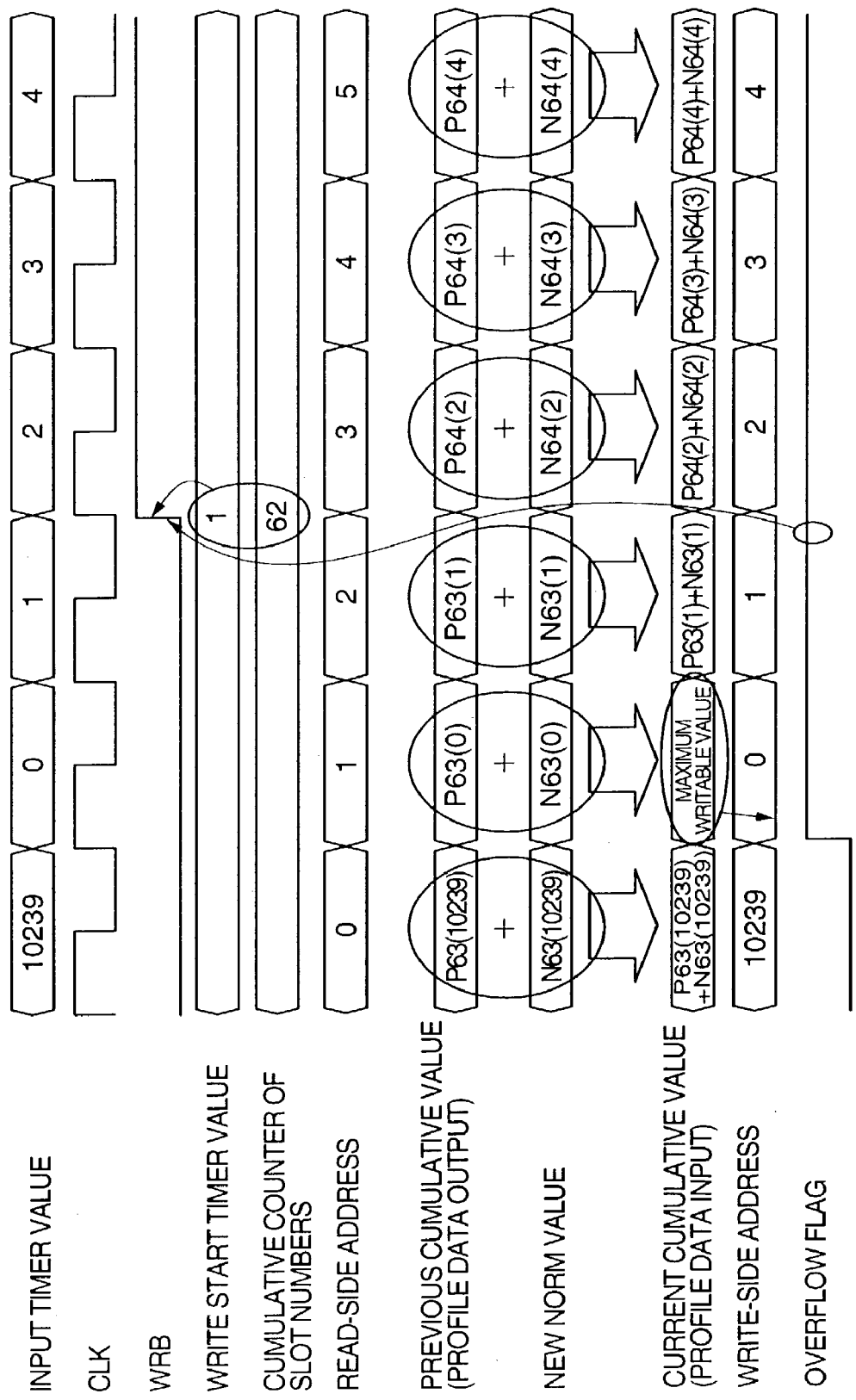

METHOD FOR PREPARING A PROFILE IN W-CDMA COMMUNICATION

BACKGROUND OF THE INVENTION

1. Field of the Invention

The present invention relates to a method for preparing a profile in communication based on wide-band code division multiple access (W-CDMA), specifically to a method for preparing a profile enabling the signals from a handheld phone (mobile unit) to synchronize with the signals of a base station.

2. Description of the Prior Art

Generally, in communication based on W-CDMA, the signals from mobile units and the signals from base stations are not in synchrony with each other. Therefore, if a mobile unit (mobile station) seeks a connection with a most proper base station, the unit must identify the base station and try to synchronize its signals with those of the base station. According to W-CDMA, if the mobile unit wants to establish communication, and identifies the most proper base station and tries to synchronize its signals with those of the base station, the unit prepares a profile to support the synchronization.

FIG. 10 shows a conventional format of such a profile comprising frames, slots and symbols to be exchanged between the mobile unit and the base station. As shown in the figure, according to this data format, one frame has a length of 10 ms, and two frames or a transmission time interval (TTI) have a length of 20 ms (the number of frames totals 4096). The frame (e.g., frame #0) consists of 15 slots, and a slot consists of 10 symbols. Incidentally, a slot has a length of 667 μs and consists of 2560 chips, while a symbol has a length of 67 μs and consists of 256 chips.

When the mobile unit synchronizes its signals with those of the base station, it uses a primary-synchronization channel (P-SCH) formatted as described above and transmitted by the base station. The P-SCH is a physical channel which supports the signals of the mobile station to be synchronized with those of the base station. The P-SCH formatted in the same manner and having the same primary synchronization code (PSC) is spread commonly by all the base stations. The PSC is a 256 chip code, and the same for all the base stations, and for all the synchronization channels (SCHs) of the slots.

Actually, only the leading symbol (256 chip) of each slot is transmitted. The above described P-SCH consists of I- and Q-channels intersecting each other at right angles both of which spread the same code and transmit the same data.

FIG. 11 shows the relation of norm values with timing values upon which the mobile station synchronizes its signals with those of the base station using the data format as shown in FIG. 10. As shown in the figure, if a mobile station finds a communicable base station, it resorts to reverse diffusion for a length corresponding to one slot interval (10 symbols×256 chips). Only when reverse diffusion is carried out at a good chip timing enabling the synchronization of two signals here concerned, a high correlation is observed between the values detected through the I- and Q-channels, and the mobile station can successfully synchronize its signals with those of the base station.

Since the base station transmits the same signal through the I- and Q-channels at the same timing, it is possible for the mobile station to detect the synchronization timing with a high precision by receiving the I- and Q-channel signals separately, determining their correlation, and taking the result as a norm value (which may be plotted as a vector on an I-Q plane). This synchronization step is called Step 1 according to the 3rd Generation Partnership Projects (3GPP).

FIG. 11 represents the norm values (ordinate) as a function of timing values (abscissa): the total length of timing values is equal to one slot interval, and the norm value exhibits a peak corresponding to a base station (BTS A).

Generally, since the over sampling ratio (OSR) or the smallest sampling interval with respect to a chip length is over one unit, the total sample number for the one slot interval will be equal to 10 symbols×256 chips×(OSR). Further, because it is often impossible to determine the most proper base station by simply following norm values for a period equal to one slot length, it is necessary to improve the detection sensitivity by tracing norm values for several slot lengths, and accumulating the results for those slot lengths.

For example, FIG. 12 shows the addition of two norm values each representing norm values obtained for a different slot length. As shown in the figure, it is possible to cancel out noise components by adding the norm values obtained for two different slot lengths, which will enhance the sensitivity of detecting a possible peak.

FIG. 13 is a block-diagram of the principal parts of a conventional mobile unit responsible for the preparation of a profile with which the mobile unit can synchronize its signals with those of the base station. FIG. 14 is a sketchy flowchart representing the steps taken by the conventional mobile unit as shown in FIG. 13 for preparing a profile which is required for synchronization. As shown in FIGS. 13 and 14, the conventional circuit responsible for the preparation of a profile includes a profile data preparing portion 1a which prepares a profile based on timer values and new norm values fed as input. To the profile data preparing portion 1a are connected a profile memory 2a for providing a previous cumulative value and storing a current cumulative value, and a peak detection portion 3a which receives a current cumulative value from the profile data preparing portion 1a for storage, and delivers timing and norm values to the internal circuit of the mobile unit such as a handheld phone. When the unit compares a current cumulative value with a value retained in a peak timing and peak norm register 10, and finds that the current cumulative value is larger than the latter, the unit replaces the value retained in the register 10 with the current cumulative value. On the contrary, if it finds the current cumulative value is smaller, it will allow the previous value to stay in the register as before.

The profile data preparing portion 1a includes an N slot detector 4a (N represents the number of slots by which norm values are added cumulatively) equipped with a write start timer value register 5 which delivers, in response to timer input, a write enable signal (low active) WRB and a cumulative addition start timing value SST as output, and an adder 6 which achieves cumulative addition by adding a new norm value to a previous cumulative value fetched from the memory 2a. The peak detection portion 3a includes two peak registers 10 comprising a peak timing register and peak norm register, and retains a current cumulative value together with its timing value, and delivers, in response to an end flag (which may be replaced with a WRB), a prepared timing value and norm value as output to the internal circuit of the mobile unit.

In short, a new norm value fed as input is accumulated on a previous value at the same timing within each slot interval, and the accumulation result is written into the profile memory 2a. Incidentally, for the case shown in FIG. 13, OSR is 4, and the profile memory has a word width sufficiently large to contain 10240 samples.

Data flows as shown in FIG. 14: a new norm value is fed as input (step S20); a previous cumulative value is fetched from the memory 2a (step S21); and the new norm value is added to the previous cumulative value (step S22). A current cumulative value is obtained as a result of the procedure (cumulative addition), and this value is stored in the memory 2a as a profile input (step S23).

For this operation, however, the bit width of the profile memory 2a which can be expressed by the above equation is necessary. For example, if a newly fed data (new norm value) has a bit width of 16 bits, and the maximum passable slot number N is 64, the bit width of the profile memory should be 22 bits. Thus, in total, the profile memory should have a capacity to accommodate 10240 words×22 bits.

As long as the profile preparing circuit prepares a profile based on norm values thus obtained, the profile memory is urged to have a big capacity which poses a problem. Since the mobile unit mainly consists of handheld mobile phones, it is desirable to reduce the demands for its internal circuits to a level as low as possible.

However, to meet such a demand, if floating point representation is introduced so as to round off numerical data, the peak detection sensitivity will be impaired. Therefore, there is a demand for a new method which does not depend on rounding-off but allows the cumulative addition of norm values without imposing a heavy burden on the internal circuit elements.

If it is required to cumulatively add new norm values without modifying them, and cumulative addition is repeated N times, or for the number N of slots (N: the number of slots for cumulative calculation), the required bit width of the profile memory will be as described in the above equation 1. In that equation, a new norm value is fed into the input data bit width.

A new norm value is not likely to have a maximum value; and it is also unlikely that the peak of a new norm value corresponds in timing with the peak of a previous cumulative value. Therefore, out of the samples allocated to the profile memory, those allocated to higher bits often remain zero, or conversely those higher bits remain unoccupied all through the cumulative addition operation.

BRIEF SUMMARY OF THE INVENTION

SUMMARY OF THE INVENTION

The method of this invention for preparing a profile in W-CDMA which, using a timer value and norm value, helps a mobile unit to synchronize its signals with those of a base station, comprises providing a profile data preparing portion which cumulatively adds a new norm value to a previous cumulative value fetched from a profile memory, causes the result to be stored in the profile memory as a current cumulative value, and repeats the same cumulative addition each time a new norm value is fed; providing the profile data preparing portion with an overflow detection ability to detect the overflow of the profile memory; and choosing, when the overflow of the profile memory is detected, a maximum writable value of the profile memory, and causing the profile memory to store the maximum writable value as a current cumulative value.

BRIEF DESCRIPTION OF THE DRAWINGS

The above-mentioned and other objects, features and advantages of this invention will become more apparent by reference to the following detailed description of the invention taken in conjunction with the accompanying drawings, wherein:

FIG. 6 is a timing chart for explaining how timing profile data have been written into the memory when writing data into the memory is discontinued in the mobile unit as depicted in FIG. 1.

FIG. 7 is a timing chart for explaining how timing profile data have been written into the memory when an overflow flag is detected during writing in the mobile unit as depicted in FIG. 1.

DETAILED DESCRIPTION OF THE INVENTION

For preparing a profile at step 1 of the W-CDMA-based communication, the present invention provides a profile preparing portion with an overflow detecting means and a peak detecting portion with a previous peak (timing, norm) register. Generally, when a new norm value is added to a previous cumulative value, the result is called a current cumulative value. According to this invention, if the current cumulative value "overflows" the allocated capacity of a memory (i.e., exceeds the maximum writable value permissible to the memory), the overflow is detected, and cumulative addition is repeated up to the slot in which the overflow is detected. Then, the processor of the mobile unit informs the other circuit elements that cumulative addition has been ended, and transmits the peak timing of the preceding slot, and the lastly obtained cumulative value to other involved circuit elements, and completes operation. As a consequence, it becomes possible to reduce the bit width of the profile memory which is determined by the maximum number of cumulative addition, which leads to the reduced size of the profile memory.

The embodiments of this invention will be described with reference to attached figures.

Figure 1:
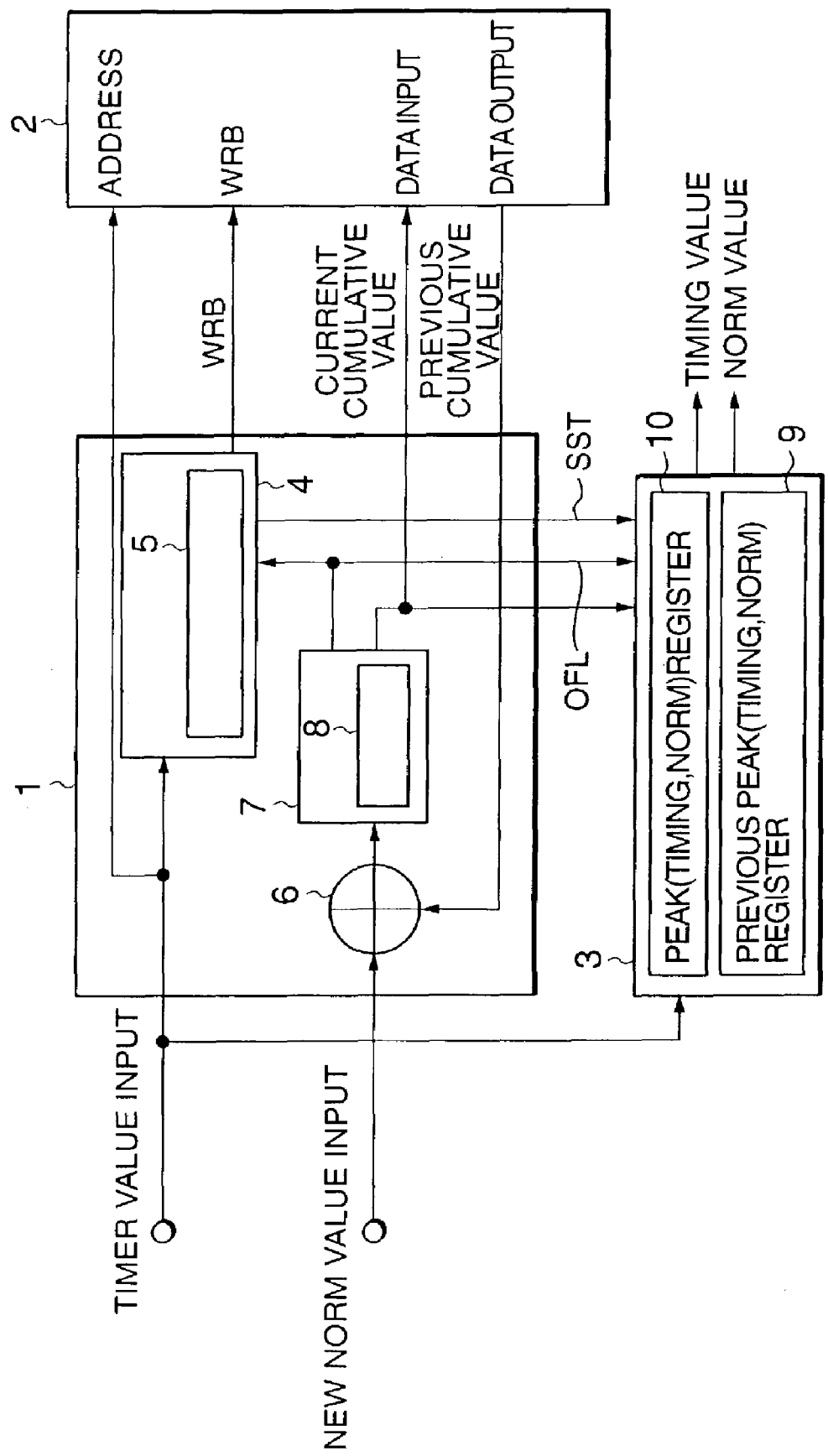
FIG. 1 is a block diagram of an illustrative embodiment of this invention representing the principal parts of a mobile unit responsible for the preparation of a profile upon which the unit can synchronize its signals with those of a base station.

FIG. 1 is a block diagram of an illustrative embodiment of this invention representing the principal parts of a mobile unit responsible for the preparation of a profile upon which the unit can synchronize its signals with those of a base station. As shown in the figure, the profile preparing circuit of this embodiment is equipped with a profile data preparing portion 1 which prepares a profile based on a timer value and new norm value fed as input. To the profile data preparing portion 1 are connected a profile memory 2 for providing a previous cumulative value and storing a current cumulative value, and a peak detection portion 3 which receives a current cumulative value from the profile data preparing portion 1 for storage, detecting the peak by the current cumulative value timing value SST and the overflow flag OFL, and delivers timing and norm values to the internal circuit of the mobile unit such as a handheld phone.

The profile data preparing portion 1 includes a N slot detector 4 (N represents the number of slots by which norm values are added cumulatively) equipped with a write start timer value register 5 which delivers, in response to timer input, a write enable signal (low active) WRB and a cumulative addition start timing value SST as output, an adder 6 which adds a new norm value to a previous cumulative value fetched from the memory 2 and the overflow detecting portion 7 which outputs current cumulative value and the overflow flag OFL with an input from the output of the adder 6. The peak detection portion 3 includes four peak registers 10, that is, a previous peak timing register, previous norm register 9, peak timing register, and peak norm register 10, and receives timer values, cumulative addition start timing values SST and the overflow flag OFL, while it delivers an appropriate timing value and norm value as output to the internal circuit of the mobile unit.

Next, how the above-described profile data preparing portion 1 together with the profile memory 2 and peak detecting portion 3 can determine, when a current cumulative value attains a peak, the timing value of the peak.

In this illustrative case, with the profile memory, the number of words corresponds to the length of a slot, and both the read and write addresses are defined by timer values. Firstly, the unit causes the adder 6 of the profile data preparing portion 1 to add a new norm value fed via the first input terminal to a previous cumulative value fetched from the profile memory 2. The N slot detecting portion 4 supports the formation of a profile having a length of predetermined N slots, by receiving a timer value, or a write start timer value fed via the second input terminal, and storing it in the write start timer value register 5.

On the other hand, the peak detection portion 3 compares a current cumulative value with a peak (norm) register value stored there, with reference being made to the contents of the previous peak timing register, previous peak norm register 9, peak timing register and peak norm register 10, and detects a peak. The peak detecting portion 3, each time it completes the cumulative addition for a new norm value having a slot length, transfers, in an appropriate timing with respect to a cumulative addition start timing value SST provided by the N slot detector 4, a peak (timing, norm) register value of the peak (timing, norm) register 10 to the previous (timing, norm) register 9 to update corresponding data there.

The overflow detecting portion 7 of the profile data preparing portion 1 determines whether a new cumulative value which has been obtained as a result of the last cumulative addition is an overflow data or not. If it finds that a new cumulative value indicates an overflow, it changes the overflow flag (OFL) into a high (H) state. The H-OFL is distributed to other circuit blocks to inform them of the occurrence of overflow. If OFL turns to H before cumulative addition is repeated up to N times, the N slot detector 4 causes the write enable signal WRB to take an H state, and completes the operation necessary for the preparation of the profile. Then, the peak detecting portion 3 causes the previous peak (timing, norm) register 9 to deliver as output a peak (timing, norm) register value representing a peak value for the slot preceding the last slot where the preparation of the profile has been discontinued.

Thanks to this circuit arrangement, it is possible to properly treat an overflow, even if the overflow arises before cumulative addition is not repeated up to a predetermined slot number, and to retain a peak timing and peak norm as usual. This arrangement will enable the bit width of the profile memory to be reduced.

To further reduce the bit width of the profile memory 2, the following method may be adopted. Several upper bits which remain unoccupied in usual operation are eliminated (shortened bit width). This will not affect cumulative addition, as long as data are fed as expected. This will not affect the normal course of events even if data are fed in an unexpected manner, because then the shortened bit width can be taken as a means to detect a peak earlier than is possible with the intact bit width: if unexpectedly large data are fed, the overflow detector 7 detects an overflow earlier than is possible with the intact bit width. For this purpose, it is only necessary for the overflow detector 7 to retain a sufficiently large capacity to accept the maximum writable value (1048575 for 20 bits). In short, the unit never fails to compare a currently generated cumulative value with the maximum writable value permissible to the memory 2, each time cumulative addition is performed by the adder 6 and overflow detector 7.

If the overflow detector 7 finds "a current cumulative value exceeds the maximum writable value," the detector determines that an overflow occurs, and feeds the maximum writable value to the profile memory 2 for storage. Simultaneously, the detector changes the OFLs directed to the peak detecting portion 3 and N slot detector 4 to state H. The OFL remains at a low (L) state when preparation of the profile is started. However, once an overflow is detected, it turns to state H and remains there. Then, the unit continues cumulative addition until the end of the slot where the overflow arose. The peak detecting portion 3 compares a newly obtained cumulative value with the peak norm value during the progress of cumulative calculation, and, when it finds that "the newly obtained cumulative value exceeds the peak norm value," it replaces the peak norm value with the newly obtained cumulative value, which is then taken as a new peak norm value. The previous peak norm value is transmitted to the previous peak (timing, norm) register 9 for storage, while the new peak norm value is transmitted to the peak (timing, norm) register 10.

Each time cumulative addition is completed for a slot, the peak (timing, norm) register value determined by the peak detecting portion 3 for the slot is transmitted to the previous peak (timing, norm) register 9 for storage. By so doing it is possible to recover the peak timing and peak norm values for any slot previous to a slot where an overflow occurs. Incidentally, the end timing of cumulative addition for a slot can be obtained by comparing the write start timer value with the timer value fed as input, the write start timer value being stored in the write start timer value register 5 of the N slot detector 4.

Next, the steps taken by the profile data preparing portion 1 equipped with the profile memory 2 and peak detecting portion 3 for preparing a profile will be described below.

Figure 2:
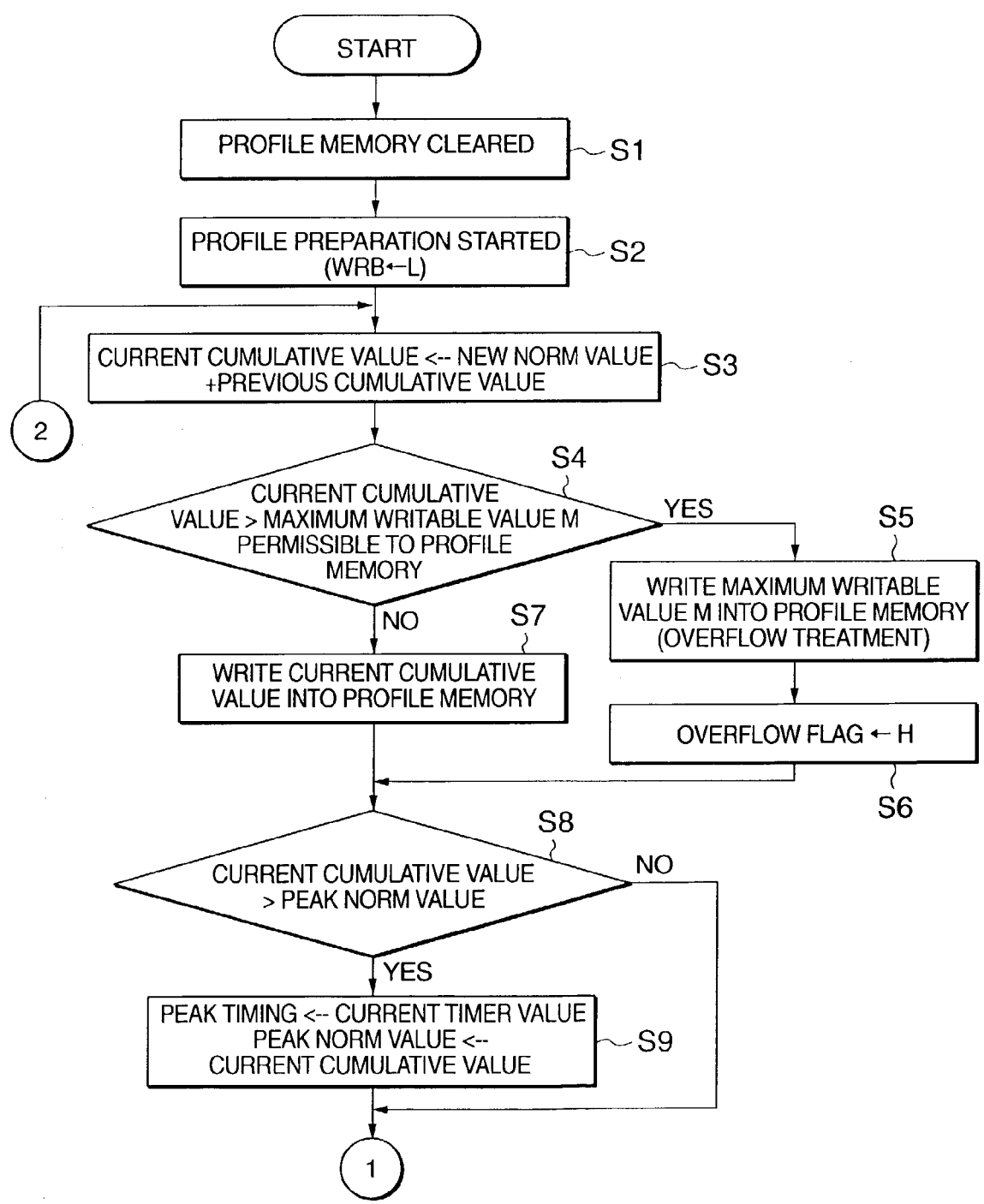
FIG. 2 is a flowchart of the foregoing steps taken by the mobile unit of FIG. 1 for preparing a profile which supports synchronization.
Figure 3:
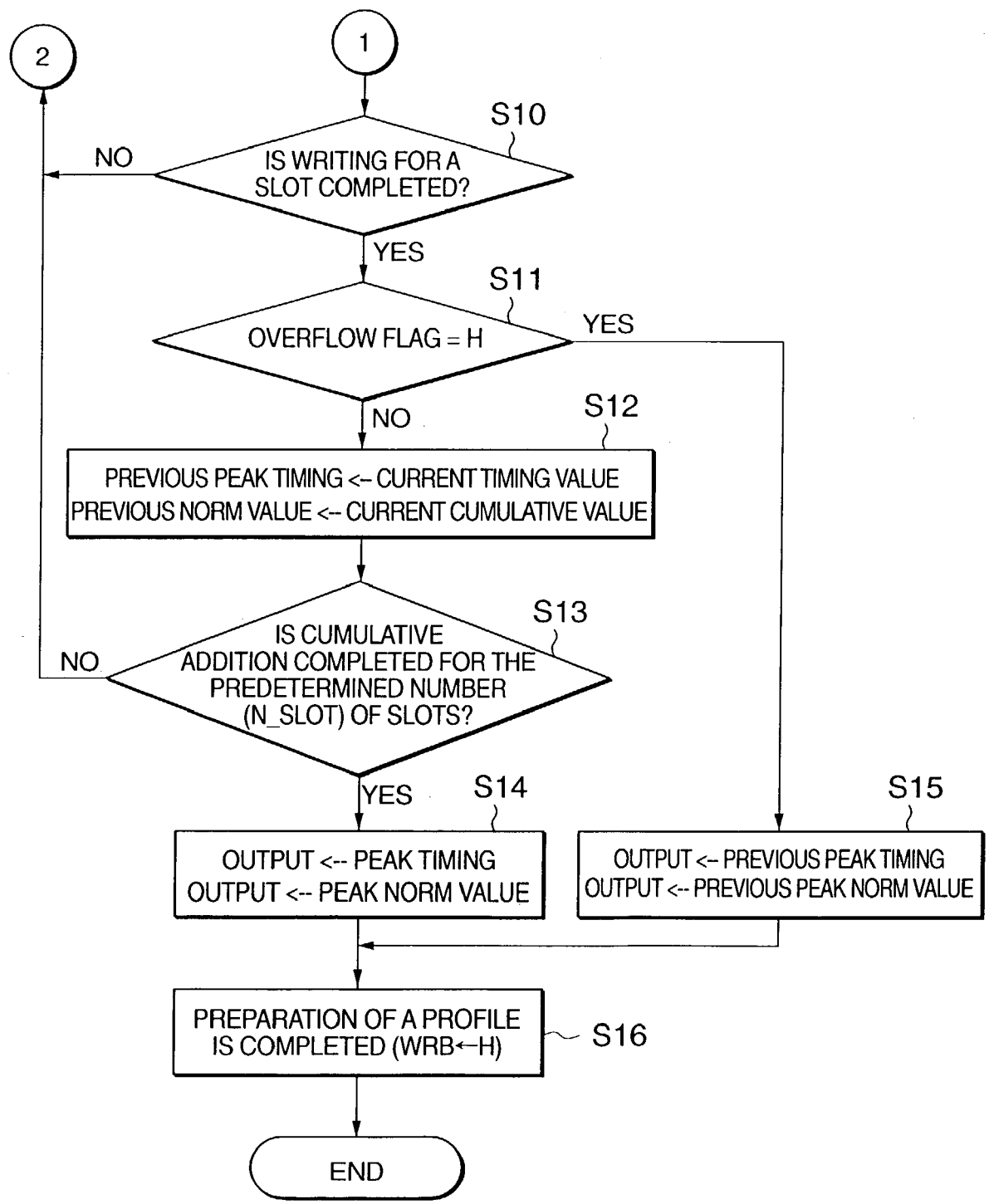
FIG. 3 is a flowchart of the succeeding steps taken by the mobile unit of FIG. 1 for preparing a profile which supports synchronization.

FIGS. 2 and 3 are a flowchart of the steps taken by the mobile unit of FIG. 1 for preparing a profile which supports synchronization: FIG. 2 represents the foregoing half of the flowchart while FIG. 3 the latter half of the same. As shown in FIGS. 2 and 3, firstly, just before preparation of a profile is started, the profile memory 2 is cleared (S1). Previous data remaining in the profile memory 2 is eliminated and the profile memory 2 becomes ready to be reset. When cumulative addition is performed for the first slot, the previous cumulative value is zero, and thus a new norm value is neatly entered into its assigned address. Then, the N slot detector 4 causes the start timer register 5 to store the timer value of the first slot, and WRB to take L. Thus, preparation of a profile is started (S2). Then, the adder 6 performs a second cumulative calculation (S3).

Here, if the overflow detector 7 finds that a new cumulative value exceeds the maximum writable value M permissible to the maximum writable value register 8 (S4) and the maximum writable value M is written to the profile memory 2 (S5), it causes OFL to take H (S6). On the contrary, if the overflow detector 7 finds that the new cumulative value does not exceed the maximum writable value M, it causes the new cumulative value to be written into the profile memory 2 (S7).

On the other hand, the peak detecting portion 3 compares a new cumulative value for each sample interval with the peak norm value of all the cumulative values hitherto obtained (S8). If the peak detecting portion 3 finds that the new cumulative value exceeds the peak norm value, it causes the current peak norm value to be replaced with the new cumulative value including its peak timing (timer value) and peak norm value (S9). On the contrary, if the new cumulative value is found not to exceed the current peak norm value, the current peak norm value will be stored as before. Incidentally, the operation represented by the circled number one of FIG. 2 continues to the operation represented by the circled number two of the same figure.

The above operation is repeated for a succeeding slot (S10) On completion of the slot, the unit checks the state of OFL (S11). If the unit finds OFL takes H, the unit causes the peak detecting portion 3 to deliver the previous timing and previous peak norm value as output (S15), and WRB to take H, and preparation of the profile to be ended (S16).

On the contrary, if the unit finds OFL takes L, it causes the current peak timing and peak norm value (register 10) to be stored in the previous timing and previous peak norm value register 9 (S12). Then, the unit instructs the N slot detector 4 to check whether cumulative calculation has been repeated for the predetermined number N of slots (S13). If the repetition of cumulative calculation is short of the predetermined number N of slots, the unit instructs the adder 6 to continue cumulative calculation (2). Incidentally, at S10, if the unit finds data writing is not completed for a slot, it causes cumulative calculation to be continued.

If the N slot detector 4 finds cumulative calculation has been repeated for the predetermined number N of slots at S13, the unit causes the peak timing and peak norm register 10 to deliver the peak timing and peak norm value stored there as output (S14). Thus, preparation of the profile is ended (S16).

Figure 4:
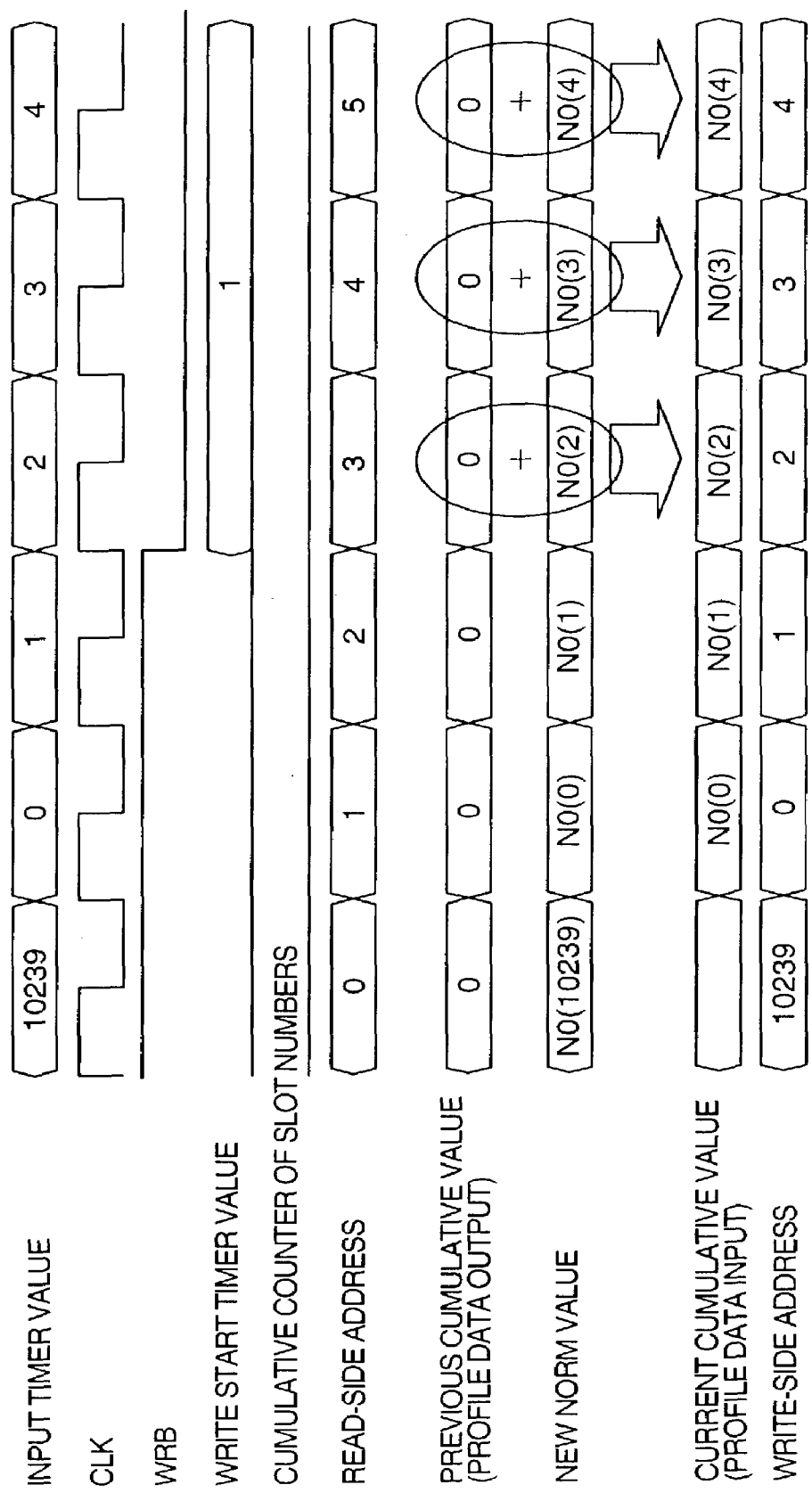
FIG. 4 is a timing chart for explaining how timing profile data will be written into a memory which becomes ready to be written in the mobile unit as depicted in FIG. 1.

FIG. 4 is a timing chart for explaining how timing profile data are going to be written into a memory which becomes ready to be written when the operation shown in FIG. 1 is started. Because in this particular example OSR is four, a clock CLK generates 10240 input timer values (0-10239) for each slot as shown in the figure. At the start of profile preparation the write enable signal takes L; the write start timer value takes 1; and the input timer value is written into the write start timer value register 5 of the N slot detector 4. At this moment, however, a cumulative slot counter (not illustrated) attached to the N slot detector 4 does not start counting yet. The timer values (0-10239) are assigned to the write-side addresses of the profile memory 2 for their identification. On the other hand, the timer values to be assigned to the read-side addresses of the profile memory are advanced (subtracted) by one from the counterparts of the write-side addresses.

In this particular example, when the timer value takes 2, preparation of a profile is started. The initial three sample intervals do not participate in the preparation of a profile. At the fourth sample interval, WRB is caused to take L, and cumulative addition is started. The timer value at which cumulative addition is started is recorded in the write start timer value register 5.

Figure 5:
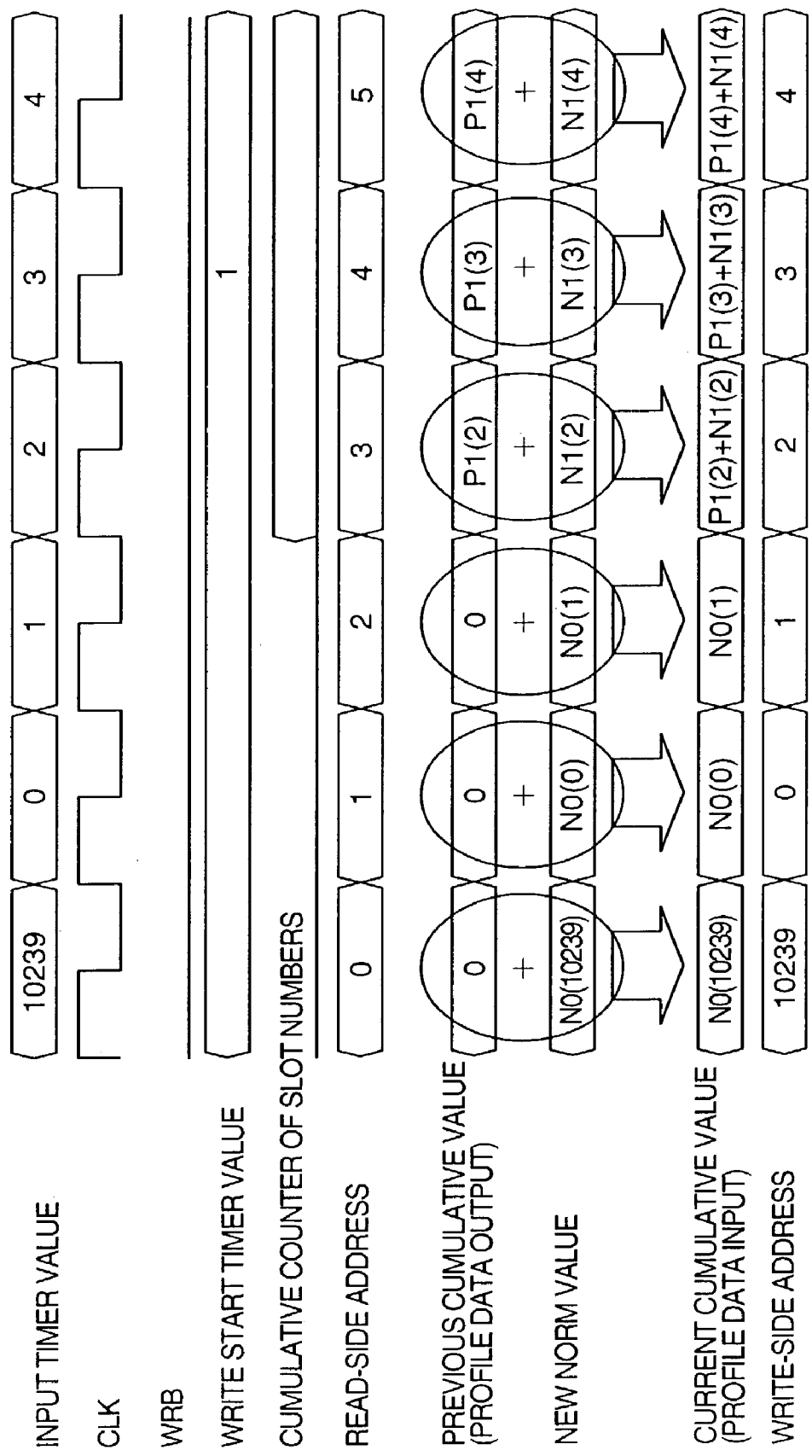
FIG. 5 is a timing chart for explaining how timing profile data are being written into the memory during writing in the mobile unit as depicted in FIG. 1.

FIG. 5 is a timing chart for explaining how timing profile data is being written into the memory during writing proceeded shown in FIG. 1. The figure shows the timing of data when writing of data for a first slot has just ended, and writing of data for a second slot has just started. Each time the input timer value is equal to the write start timer value, the cumulative slot counter is incremented by one. The timing of operations is the same with that in FIG. 4. However, as shown in FIG. 5, writing of data for the first slot has just ended and writing of data for the second slot has just started. Thus, at each of the initial sample intervals for the second slot, there are a previous norm value as well as a new norm value whereas for each of the sample intervals of the first slot there is no previous norm value.

FIG. 6 is a timing chart for explaining how timing profile data have been written into the memory when writing data into the memory proceeded as shown in FIG. 1 is interrupted. The figure shows data continue to be written without being interrupted by an overflow until the predetermined number N of slots has been passed. Thus, the cumulative slot number becomes equal to the predetermined slot number N, and the input timer value corresponds with the write start timer value. Then, cumulative addition is ended, and WRB is caused to take H. Any cumulative value appearing hereafter is rejected to enter the profile memory 2. Thus, preparation of a profile is ended.

FIG. 7 is a timing chart for explaining how timing profile data have been written into the memory when an overflow flag is detected during writing in the mobile unit as depicted in FIG. 1. As shown in the figure, overflowing is detected while a profile is being prepared: overflowing occurs at timer value 0, that is, a current cumulative value (input data to the profile memory 2) at the timer value 0 overflows the memory, and immediately thereafter OFL takes an H state. In this particular case, the overflow occurs when cumulative addition has been completed for 62 slots, and then OFL is activated and further cumulative addition is withdrawn.

According to the above embodiments, because the profile data preparing portion 1 includes the overflow detector 7, it is possible to retain peak timing and peak norm values even when overflow occurs, and thus to reduce the bit width of the profile memory, which helps to simplify the circuit elements of the unit. Let's consider the case more specifically. If a current cumulative value exceeds the maximum writable value M of the profile memory 2 or, in other words, an overflow occurs even when cumulative addition is not yet performed for the predetermined number N of slots, preparation of the profile is discontinued. This arrangement will eliminate the wasteful use of memory space of the memory 2. This will be explained more in detail with reference to FIGS. 8 and 9.

Figure 8A:
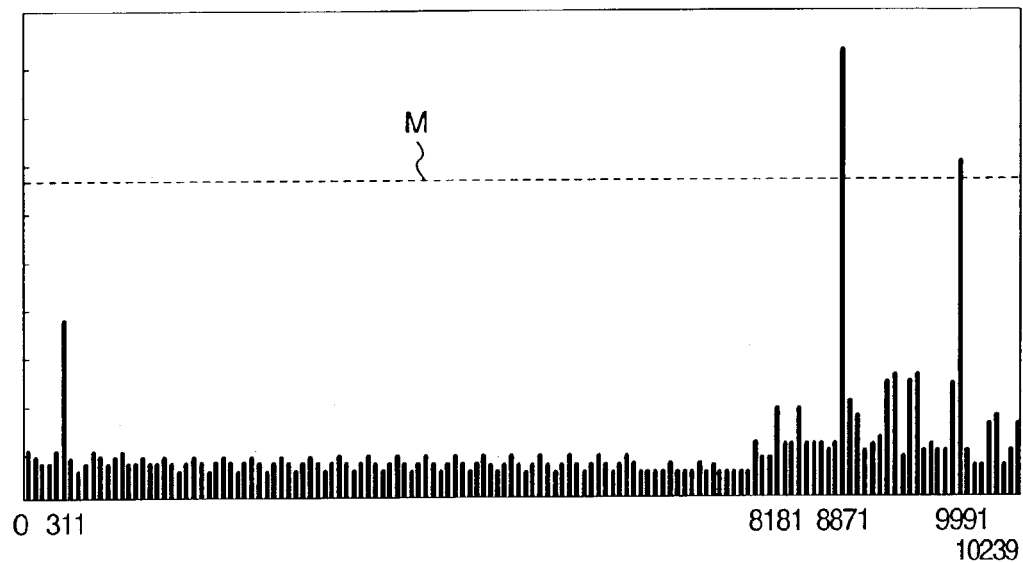
FIGS. 8A and 8B represent, in the mobile unit as depicted in FIG. 1, how data are written into a memory when the slot number N is 63, and how data have been written into the memory when overflowing of the memory is detected, respectively.
Figure 8B:
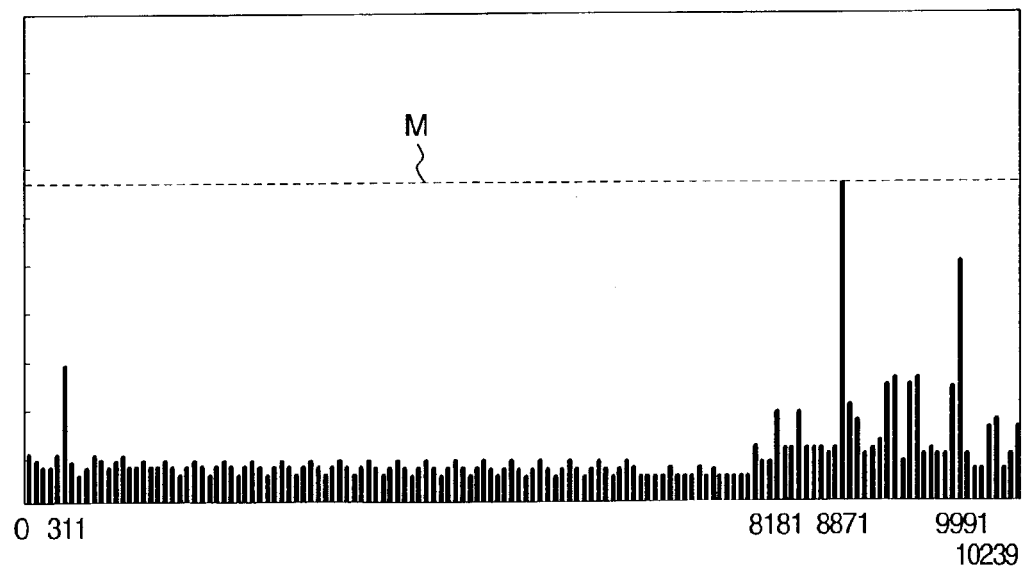

FIGS. 8A and 8B represent, in the mobile unit as depicted in FIG. 1, how data are written into a memory when the slot number N is 63, and how data have been written into the memory when overflowing of the memory is detected, respectively. FIG. 8A shows the entry of data for the 63rd slot (0-10239 in terms of timer value) with the predetermined number N of slots being 63. It is indicated that the 8499th sample gives a peak.

Let's consider the case where the data of FIG. 8A are fed to the memory 2 for storage. As shown in FIG. 8B, an overflow is detected at the timing where a peak (maximum) value appears, and then the preparation of the profile is discontinued. Thus, the profile memory 2 does not need to have a sufficient capacity to accept the total amount of peak value which will enable the memory space to be saved. The timing at which the peak occurs is also reported to be at the 8499th sample in this case.

Accordingly, if, the bit width of the profile memory 2 of this embodiment is more or less reduced, it will not impair the sensitivity of detecting the timing position of the peak occurrence.

Figure 9A:
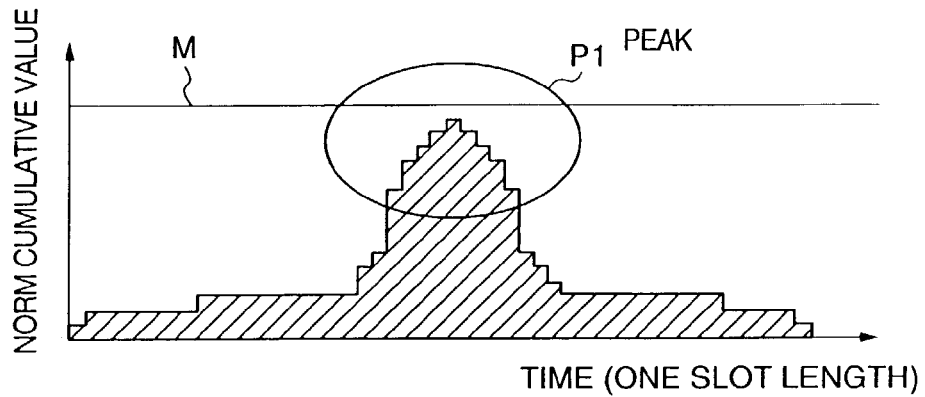
FIGS. 9A to 9C are diagrams for illustrating how norm values are cumulatively added over one slot interval as in FIG. 8.
Figure 9B:
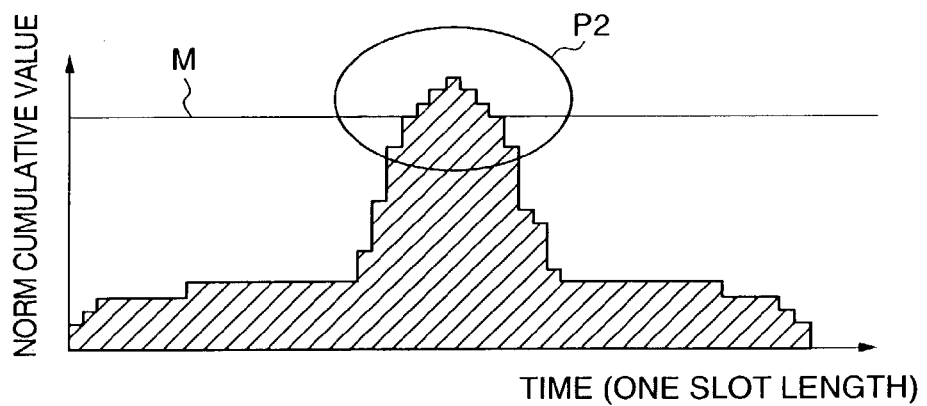
Figure 9C:
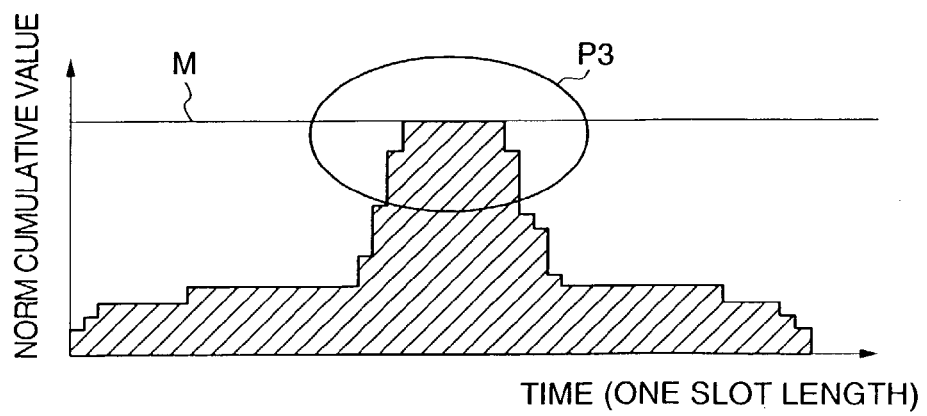
Figure 10:
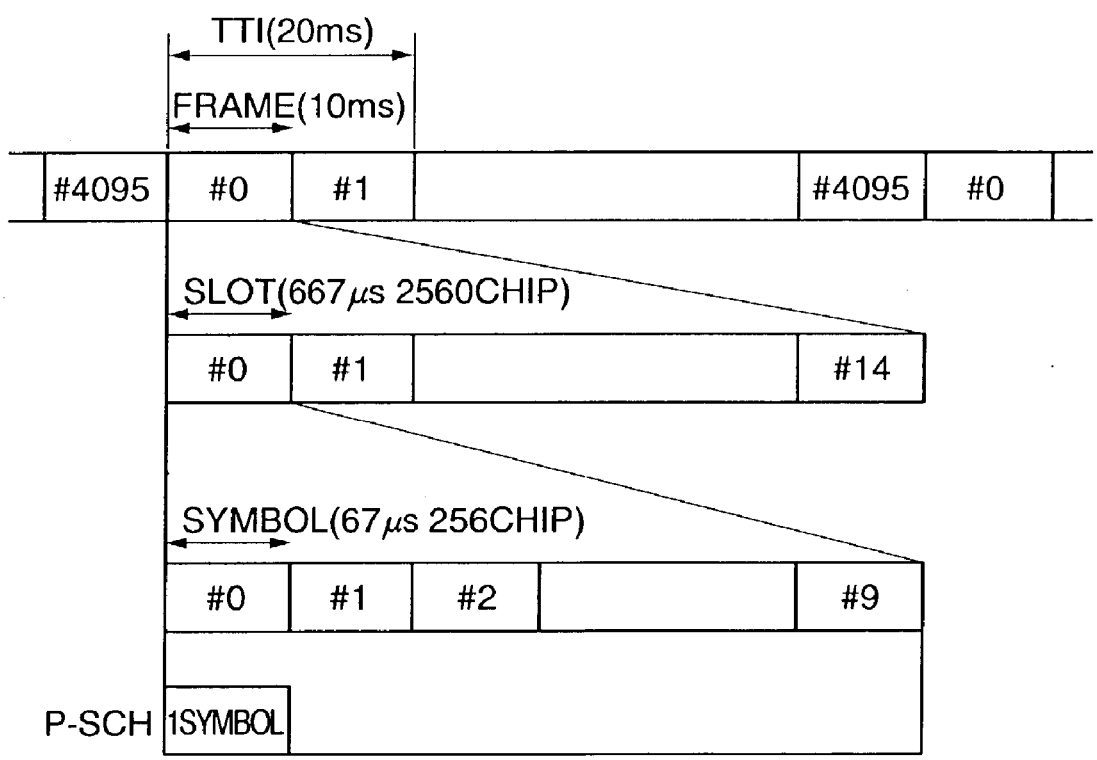
FIG. 10 shows a conventional format of a profile comprising frames, slots and symbols to be exchanged between the mobile unit and the base station.
Figure 11:
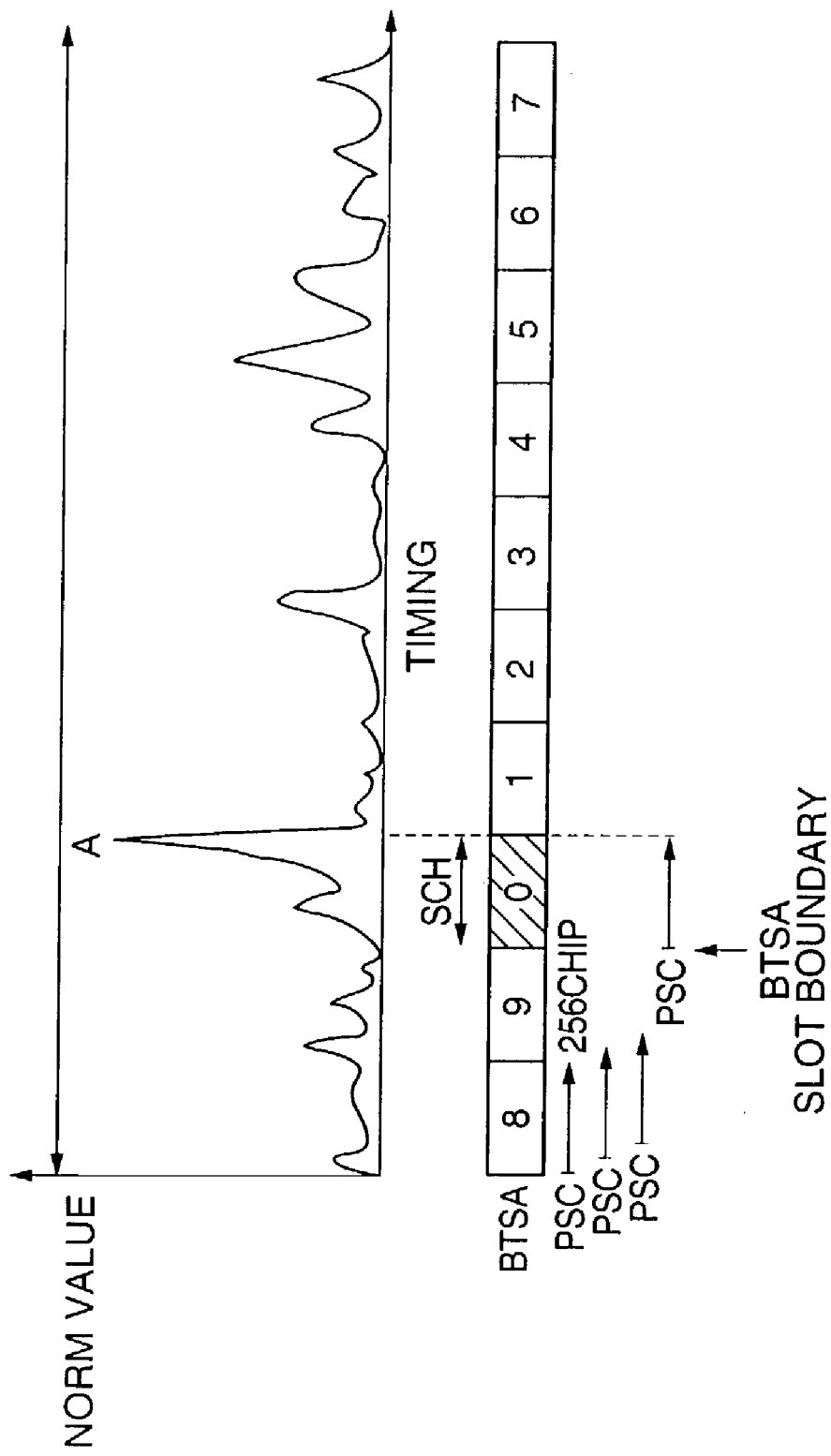
FIG. 11 shows a correlogram of norm values and slot timings upon which the mobile station synchronizes its signals with those of the base station using the data format as shown in FIG. 10.
Figure 12:
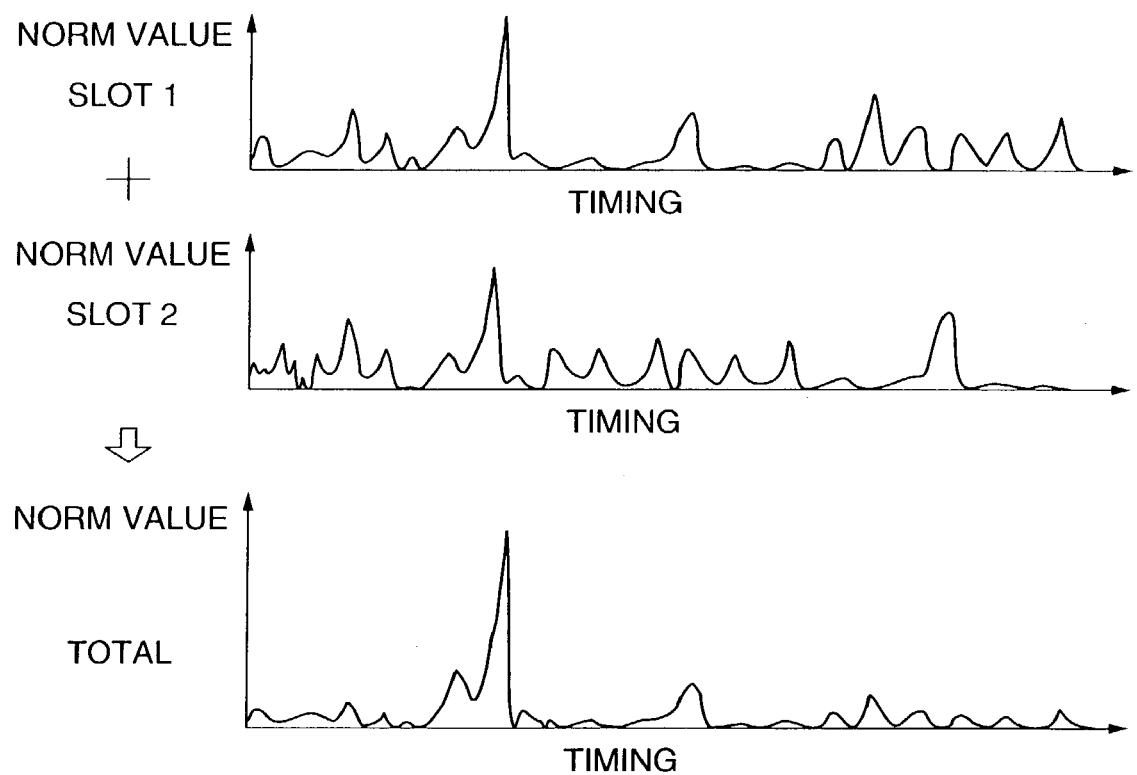
FIG. 12 shows the addition of two norm values each representing norm values obtained for one slot length.
Figure 13:
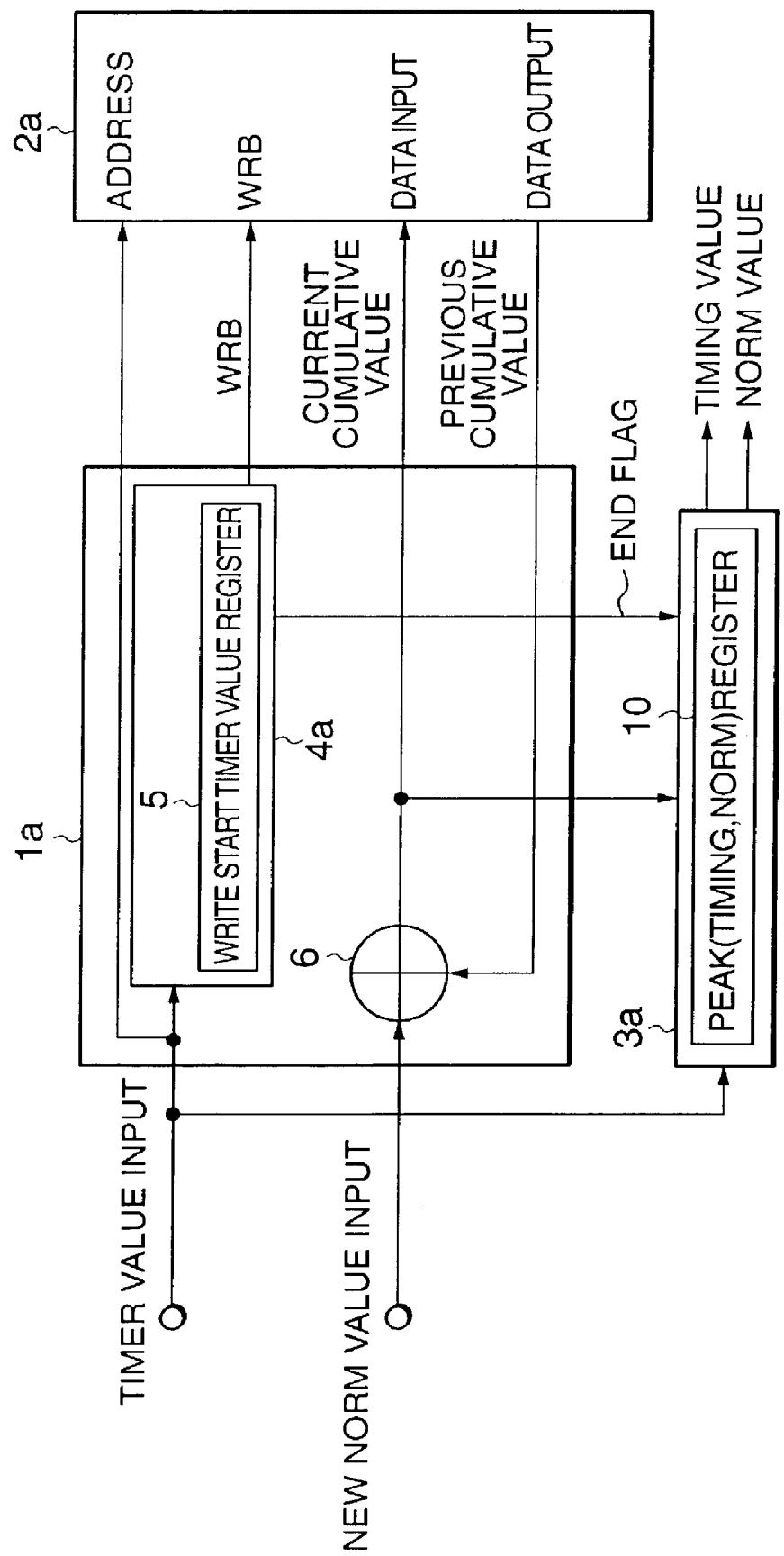
FIG. 13 is a block-diagram of the principal parts of a conventional mobile unit responsible for the preparation of a profile with which the mobile unit can synchronize its signals with those of the base station.
Figure 14:
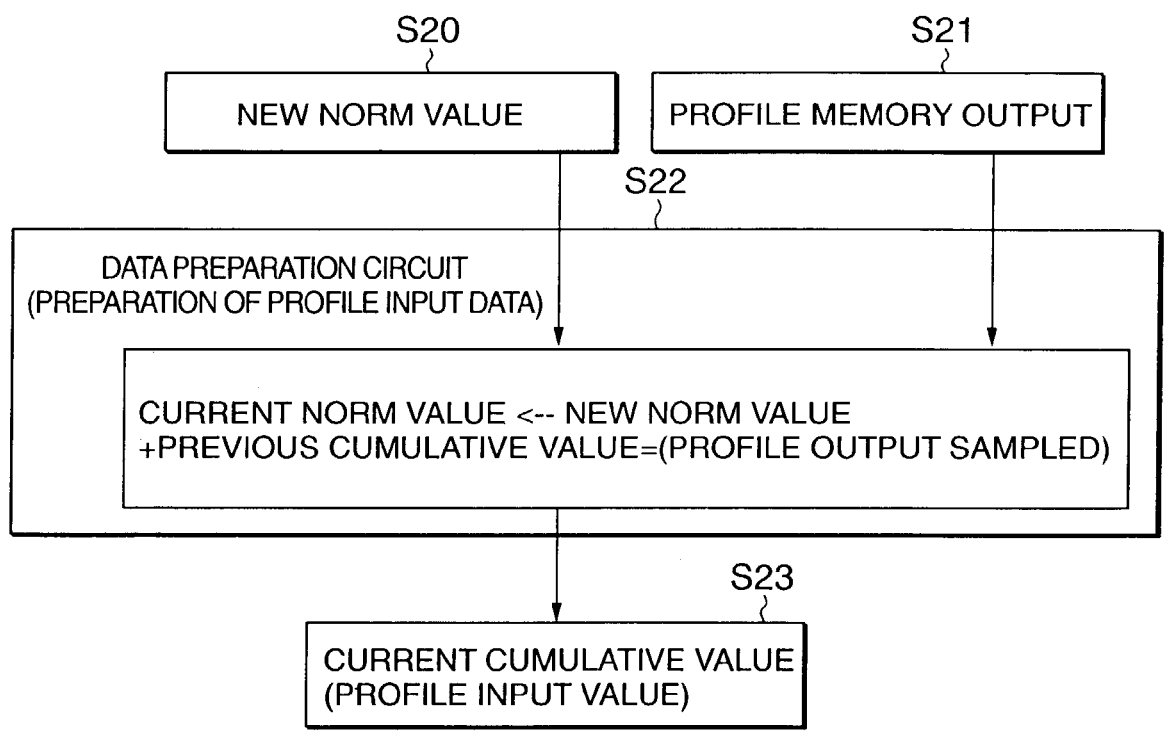
FIG. 14 is a sketchy flowchart representing the steps taken by the conventional mobile unit as shown in FIG. 13 for preparing a profile which is required for synchronization.

FIGS. 9A to 9C are diagrams for explaining how norm values are cumulatively added over one slot interval as in FIG. 8. FIG. 9A shows cumulatively added norm values over one slot interval where the peak norm value (P1) does not reach the maximum writable value M. In FIG. 9B, the peak norm value (P1) and its adjacent norm values exceed the maximum writable value M (overflow occurs) Then, in this embodiment, the norm values exceeding the maximum writable value M are forced to take a value equal to the value M as shown in FIG. 9C.

As shown above, at a time when overflowing is detected, the preparation of a profile is discontinued. Thus, the amount of data to be entered into the memory 2 can be reduced.

Next, other modified versions of the above embodiments will be described.

According to the first modified version, it is possible to discontinue the preparation of a profile when a predetermined timing value is reached. In the above embodiments, when an overflow occurs, the preparation of the profile is discontinued (data entry is ended on completion of the slot in which the overflow occurred). This may be modified such that the preparation of a profile is discontinued on completion of the slot in which the following condition is satisfied:

Previous cumulative norm value+maximum input norm value (theoretical)>maximum writable value M When this condition is implemented, no norm value that overflows the memory space remains in a profile. The norm values of the last slot are registered instead of norm values of the previous slot which makes it unnecessary to store the previous peak value, and to thereby reduce the size of the circuit.

According to the second modified version, the preparation of a profile is discontinued on completion of the slot in which the following condition is satisfied:

Previous cumulative norm value+maximum norm value among the hitherto obtained norm values>maximum writable value M.

Each time a new norm value is fed, or at regular intervals, the maximum norm value is updated, and the maximum value is entered into the above inequality to see whether overflow condition is met or not. Once it is found the overflow condition is met, the overflow treatment is introduced. If an overflow occurs before the checking, data entry is discontinued on completion of the slot at which the overflow occurred as described above with respect to an embodiment. Then, the peak norm value and peak timing of the slot preceding the last slot where the overflow occurred are registered.

According to the third modified version, the preparation of a profile is discontinued on completion of the slot in which the following condition is satisfied:

Previous cumulative norm value+average of the hitherto obtained norm values>maximum writable value M.

Each time a new norm value is fed, or at regular intervals, the average norm value is updated, and the average value is entered into the above inequality to see whether overflow condition is met or not. Once it is found the overflow condition is met, the overflow treatment is introduced. If an overflow occurs before the checking, data entry is discontinued on completion of the slot in which the overflow occurred as described above. Then, the peak norm value and peak timing of the slot preceding the last slot where the overflow occurred are registered.

According to the fourth modified version, the preparation of a profile is discontinued on completion of the slot in which the following condition is satisfied:

Previous cumulative norm value+externally fed predetermined value>maximum writable value M.

In this case, externally fed predetermined values are used for the control of profile preparation. Thus, it is possible to prepare a profile according to externally introduced conditions, and thus to improve the sensitivity of detecting a peak, and to reduce the likeliness of the discontinuation of profile preparation on account of an overflow encountered before the passage of the predetermined number of slots. If an overflow occurs before checking, data entry is discontinued on completion of the slot in which the overflow occurred as described above.

According to the fifth modified version, the preparation of a profile is discontinued on completion of the slot in which the following condition is satisfied:

Cumulative norm value of the first peaks−cumulative norm value of the second peaks>externally fed predetermined value.

Incidentally, the first to fourth modified versions described above deal only with the cumulative norm value of the first peaks. However, the fifth modified version introduces the cumulative value of the second peaks and uses it in the detection of an overflow. If an overflow occurs before checking, data entry is discontinued on completion of the slot in which the overflow occurred as described above.

According to the sixth modified version, the preparation of a profile is discontinued on completion of the slot in which the ratio of the cumulative norm value of the first peaks against the counterpart of the second peaks reaches an externally fed predetermined value, instead of the difference between the cumulative norm value of the first peaks and the counterpart of the second peaks as in the fifth modified version.

As soon as the above equation 2 is found to be satisfied, the preparation of a profile is discontinued. If an overflow occurs before checking, data entry is discontinued on completion of the slot in which the overflow occurred as described above.

According to the seventh modified version, the preparation of a profile is discontinued on completion of the slot in which the following condition is satisfied:

Cumulative norm value of the first peaks−average of all cumulative norm values>externally fed predetermined value.

As described above, the first to fourth modified versions deal only with the cumulative norm value of the first peaks. However, the seventh modified version uses the average of all cumulative norm values for the detection of an overflow. If an overflow occurs before checking, data entry is discontinued on completion of the slot in which the overflow occurred as described above.

According to the eighth modified version, the preparation of a profile is discontinued on completion of the slot in which the ratio of the cumulative norm value of the first peaks against the average of all cumulative norm values reaches an externally fed predetermined value, instead of the difference between the cumulative norm value of the first peaks and the average of all cumulative norm values as in the seventh modified version.

As soon as the above equation 3 is found to be satisfied, the preparation of a profile is discontinued. If an overflow occurs before checking, data entry is discontinued on completion of the slot in which the overflow occurred as described above.

According to the ninth modified version, the preparation of a profile is discontinued at the moment when an overflow data is detected, instead of on completion of the slot in which an overflow is detected as in the above first to eighth modified versions, and peak timing and peak norm values obtained for the slot preceding the last slot are registered. According to this ninth modified version, preparation of a profile is discontinued at the moment when an overflow is detected. Thus, the number of data samples accumulated in the profile memory undergoes a stepwise shift at the timing value where the overflow occurred. However, this does not pose any problem because it does not practically affect the peak timing and peak norm values.

According to the tenth modified version, when an overflow data is detected, the peak timing and peak norm values obtained for the previous slot are registered instead of the maximum writable value M as in the foregoing modified versions.

According to the eleventh modified version, the peak detecting portion 3 as well as the adder 6 and peak (timing) register 10 are allowed to have a bit width increased by one bit as compared with foregoing examples so that overflow will not concentrate on the peak detecting portion 3. In this example, if an overflow occurs the peak timing and peak norm values for the slot preceding to the last slot are not registered. Instead, the following method may be adopted: cumulative addition is continued till the end of the slot where an overflow occurred; and the peak detecting portion 3 compares a current cumulative value with a peak (norm) value till the end of the slot, to obtain peak timing and peak norm values proper to the slot which are then registered.

The present invention has been described with reference to some embodiments. However, the present invention is not limited to those embodiments, and, needless to say, their modifications and variations are apparently possible.

According to the method of this invention for preparing a profile suitable for W-CDMA based communication wherein a profile data preparing portion is provided with an overflow detector. Therefore, even if an overflow occurs, peak timing and peak norm values can be safely retained. Therefore, it becomes possible to reduce the bit width of the profile memory. With the reduced bit width of profit memory, a new norm value is more likely to exceed a maximum writable value of the profile memory (overflow) before the passage of a predetermined number of slots, and if an overflow is detected, the preparation of the file is discontinued. This course of events will be helpful for preventing the wasteful use of the profile memory.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. A method for preparing a profile in W-CDMA which, using a timer value and norm value, helps a mobile unit to synchronize its signals with those of a base station, comprising:

providing a profile data preparing portion which cumulatively adds a new norm value to a previous cumulative value fetched from a profile memory, to cause the result to be stored as a current cumulative value in a profile memory and repeat the same cumulative addition each time a new norm value is fed to said portion;

furnishing the profile data preparing portion with an overflow detection ability to detect the overflow of the profile memory; and choosing, when the overflow of the profile memory is detected, a maximum writable value of the profile memory, and causing the profile memory to store said maximum writable value as a current cumulative value.

2. A method of claim 1 for preparing a profile in W-CDMA wherein the profile data preparing portion comprises:

a register for recording the maximum writable value of the profile memory;

an N slot detector which detects the passage of a predetermined number of slots depending on a timer value provided each time a new slot is fed; and a peak detecting portion including a previous timing register and previous peak norm register, and wherein, if the N slot detector detects the passage of a predetermined number of slots, an overflow flag is delivered to the two registers as a threshold of peak detection to cause thereby the preparation of the profile to be discontinued.

3. A method of claim 2 for preparing a profile in W-CDMA wherein, if the profile memory is overflowed, the profile data preparing portion causes succeeding operations to be discontinued even when the N slot detector does not yet detect the passage of a predetermined number N of slots.

4. A method of claim 2 for preparing a profile in W-CDMA wherein, if the profile data preparing portion suspects that the profile memory will be overflowed during the passage of a next slot, it causes succeeding operations to be discontinued even when the N slot detector does not yet detect the passage of a predetermined number N of slots.

5. A method of claim 2 for preparing a profile in W-CDMA wherein, if the profile data preparing portion finds that addition of a new norm value to a hitherto obtained maximum norm value will overflow the profile memory, the portion in question causes succeeding operations to be discontinued even when the N slot detector does not yet detect the passage of a predetermined number N of slots.

6. A method of claim 2 for preparing a profile in W-CDMA wherein, if the profile data preparing portion finds that addition of a new norm value to a hitherto obtained average norm value will overflow the profile memory, the portion in question causes succeeding operations to be discontinued even when the N slot detector does not yet detect the passage of a predetermined number N of slots.

7. A method of claim 2 for preparing a profile in W-CDMA wherein, if the profile data preparing portion finds that addition of a new norm value to a predetermined norm value will overflow the profile memory, the portion in question causes succeeding operations to be discontinued even when the N slot detector does not yet detect the passage of a predetermined number N of slots.

8. A method of claim 2 for preparing a profile in W-CDMA wherein, if the profile data preparing portion finds that the difference between the first and second cumulatively added peak norm values reaches a predetermined value, the portion in question causes succeeding operations to be discontinued even when the N slot detector does not yet detect the passage of a predetermined number N of slots.

9. A method of claim 2 for preparing a profile in W-CDMA wherein, if the profile data preparing portion finds that the ratio of the first cumulatively added peak norm value against the second cumulatively added peak norm value reaches a predetermined value, the portion in question causes succeeding operations to be discontinued even when the N slot detector does not yet detect the passage of a predetermined number N of slots.

10. A method of claim 2 for preparing a profile in W-CDMA wherein, if the profile data preparing portion finds that the difference between a cumulatively added peak norm value and a cumulatively added average norm value reaches a predetermined value, the portion in question causes succeeding operations to be discontinued even when the N slot detector does not yet detect the passage of a predetermined number N of slots.

11. A method of claim 2 for preparing a profile in W-CDMA wherein, if the profile data preparing portion finds that the ratio of a cumulatively added peak norm value against a cumulatively added average norm value reaches a predetermined value, the portion in question causes succeeding operations to be discontinued even when the N slot detector does not yet detect the passage of a predetermined number N of slots.

12. A method for preparing a profile in W-CDMA comprising:

the first step of causing an N slot detector of a profile data preparing portion to start the preparation of a profile;

the second step of causing an adder of the profile data preparing portion to cumulatively add a new norm to a previous cumulative value to produce thereby a current cumulative value;

the third step of causing an overflow detector to check whether the current cumulative value exceeds a maximum writable value, and, if the overflow detector finds that the current cumulative value exceeds the maximum writable value, causing an overflow treatment to be introduced;

the fourth step of causing a peak detecting portion to compare, for each sample, the current cumulative value with a peak norm value, i.e., the maximum of all hitherto obtained norm values, and, if the current cumulative value exceeds the peak norm value, causing the peak norm value to be replaced with the current cumulative value which will then serve as a new peak norm value, and, if the current cumulative value does not exceed the peak norm value, causing the peak norm value to stay as before;

the fifth step of repeating peak detection of the fourth step until the detection has been performed for all the timing values of a slot;

the sixth step of checking the state of overflow flag on completion of peak detection for each slot;

the seventh step of causing, if it is found that the overflow flag takes a high state, the peak detecting portion to deliver a previous peak timing and previous peak norm value as output, and a write enable signal to take a high state, thereby preparation of the profile to be discontinued; and the eighth step of causing, if it is found at the sixth step that the overflow flag takes a low state, a current peak timing and current peak norm value to be recorded in the previous peak timing and previous peak norm registers respectively, an N slot detector to check whether cumulative addition has been performed for all the predetermined number N of slots, and, if the N slot detector finds cumulative addition is not yet completed, the adder to continue cumulative addition, while if the N slot detector finds cumulative addition has been completed, the peak timing and peak norm registers to deliver a peak timing and peak norm value as output, thereby preparation of the profile to be discontinued.

* * * * *